UNITED STATES PATENT OFFICE.

GADIENT ENGI, OF BASEL, SWITZERLAND, ASSIGNOR TO SOCIETY OF CHEMICAL INDUSTRY IN BASLE, OF BASEL, SWITZERLAND.

RED VAT DYE AND PROCESS OF MAKING SAME.

No. 923,959.     Specification of Letters Patent.     Patented June 8, 1909.

Application filed July 18, 1908. Serial No. 444,264.

*To all whom it may concern:*

Be it known that I, GADIENT ENGI, doctor of philosophy and chemist, a citizen of the Swiss Republic, and resident of Basel, Switzerland, have invented new and useful Red Vat Dyestuffs and a Process of Making Same, of which the following is a full, clear, and exact specification.

In the United States Letters Patent No. 841003 dated January 8th, 1907 is described a yellow-red vat-dyestuff by heating salicylthioacetic acid (phenylthioglycolorthocarboxylic acid) with an aromatic nitrohydrocarbon in presence of isatin.

I have found that the derivatives of isatin, acidylated at the nitrogen, as for instance acetylisatin

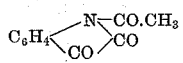

can also be condensed with 3-oxy-1-thionaphthene to an acidylderivative of the dyestuff described in the said Letters Patent No. 841003, which acidylderivative constitutes, like the not acidylated corresponding dyestuff, a dye suitable to dye animal and vegetable fibers in an alkaline vat. In this reaction the 3-oxy-1-thionaphthene can be replaced by one of its products of substitution or the oxythionaphthene-compound can be produced in the reaction mass itself by heating phenylthio-glycol-ortho-carboxylic acid or its products of substitution with the acidylisatin employed, in presence of a condensing agent capable of transforming the phenylthioglycol-ortho-carboxylic acid or its products of substitution intermediary into the corresponding oxythionaphthene-compound.

The invention will be illustrated by the following examples.

Example I: 12.6 parts of acetylisatin (obtained by heating isatin with acetic anhydrid) are boiled together with 10 parts of 3-oxy-1-thionaphthene and 100 parts of alcohol for 2 to 3 hours on a water bath in an apparatus with a reflux condenser. After cooling, the crystallized dyestuff is separated by filtration, washed with alcohol and dried. It is thus obtained in the form of well formed, brilliant red needles melting at 253 to 255° C. In cold benzene or cold nitrobenzene the dyestuff is difficultly soluble but it is easily soluble in hot benzene or hot nitrobenzene to yellow-red solutions. With concentrated sulfuric acid it gives a dirty-brown solution. On treating the dyestuff with soda lye and hydrosulfite it yields a yellow vat dyeing cotton bright, yellowish-red tints fast to washing, to light and to chlorin. Instead of starting from oxythionaphthene the phenyl-thioglycol-ortho-carboxylic acid may be employed as starting material and the transformation of this latter into oxythionaphthene and the condensation of the resulting oxythionaphthene with acetyl-isatin thus be joined in a sole operation.

Example II: 21.2 parts of phenylthioglycol-ortho-carboxylic acid are boiled with 19 parts of acetylisatin and 100 parts of acetic anhydrid for 2 to 3 hours on an oil bath. After a short time the condensation takes place, the dyestuff being precipitated. After cooling, the mass of reaction constitutes a thick paste from which the dyestuff is separated by filtration, washing with alcohol and drying. In a similar manner is effected the preparation of dyestuffs with other acidyl-derivatives of isatin and with products of substitution of the phenylthioglycol-ortho-carboxylic acid or of the oxythionaphthene, as for instance their halogenderivatives.

What I claim is:

1. The described process for the manufacture of red vat-dyestuffs by condensing one molecule of an acidyl-derivative of isatin with one molecule of an oxythionaphthene-compound.

2. The described process for the manufacture of red vat-dyestuffs by boiling one molecule of a derivative of phenylthioglycol-ortho-carboxylic acid with one molecule of an acidyl-derivative of isatin, in presence of a condensing agent capable of transforming the phenylthioglycol-ortho-carboxylic acid derivative intermediary into the corresponding oxythionaphthene-compound.

3. As new articles of manufacture, the vat-dyestuffs, which can be obtained by condensing an acidyl-derivative of isatin with an oxythionaphthene-compound, being only difficultly soluble in cold alcohol and benzene, more easily soluble in hot benzene and nitrobenzene, soluble in concentrated sulfuric acid with a dirty-brown coloration and yielding on treatment with alkaline reducing agents yellowish vats, from which vats unmordanted cotton is dyed in red shades, fast to washing, light and chlorin.

In witness whereof I have hereunto signed my name this ninth day of July 1908, in the presence of two subscribing witnesses.

GADIENT ENGI.

Witnesses:
 GEO. GIFFORD,
 ERNST WAGNER.